United States Patent [19]
Murray

[11] Patent Number: 5,040,184
[45] Date of Patent: Aug. 13, 1991

[54] STARTER CIRCUIT FOR AN RF LASER

[75] Inventor: Michael W. Murray, Palm City, Fla.

[73] Assignee: Raytheon Company, Lexington, Mass.

[21] Appl. No.: 532,789

[22] Filed: Jun. 4, 1990

[51] Int. Cl.$^5$ .............................................. H01S 3/00
[52] U.S. Cl. ........................................ 372/38; 372/87; 315/248; 315/39
[58] Field of Search ............................ 372/86, 87, 38; 315/248, 39

[56] References Cited

U.S. PATENT DOCUMENTS

| | | | |
|---|---|---|---|
| 4,380,079 | 4/1983 | Cohn et al. | 372/87 |
| 4,546,482 | 10/1985 | Bagaglia et al. | 378/87 |
| 4,589,114 | 5/1986 | Sutter, Jr. | 372/87 |
| 4,841,540 | 6/1989 | Krueger et al. | 372/86 |
| 4,924,472 | 5/1990 | Lee et al. | 378/86 |

Primary Examiner—Léon Scott, Jr.
Attorney, Agent, or Firm—Christopher L. Maginniss; Richard M. Sharkansky

[57] ABSTRACT

A radio frequency (RF) driven laser system having a starter electrode and discharge control circuitry which facilitates the starting of the laser by ionizing a portion of the gain medium. The starter electrode is aligned with the main electrode but is much smaller and is energized only during the start-up period. RF power is coupled to the main and starter electrodes via RF amplifiers feeding power through a 90° hybrid combiner to impedance matching networks which are individually adjusted for each electrode. The matching network coupled to the starter electrode provides a very high, Tesla coil type, RF voltage to the electrode. Once the start cycle is complete, a time delay circuit shuts down the starter circuit and all power from the two RF amplifiers is steered to the main electrode.

12 Claims, 3 Drawing Sheets

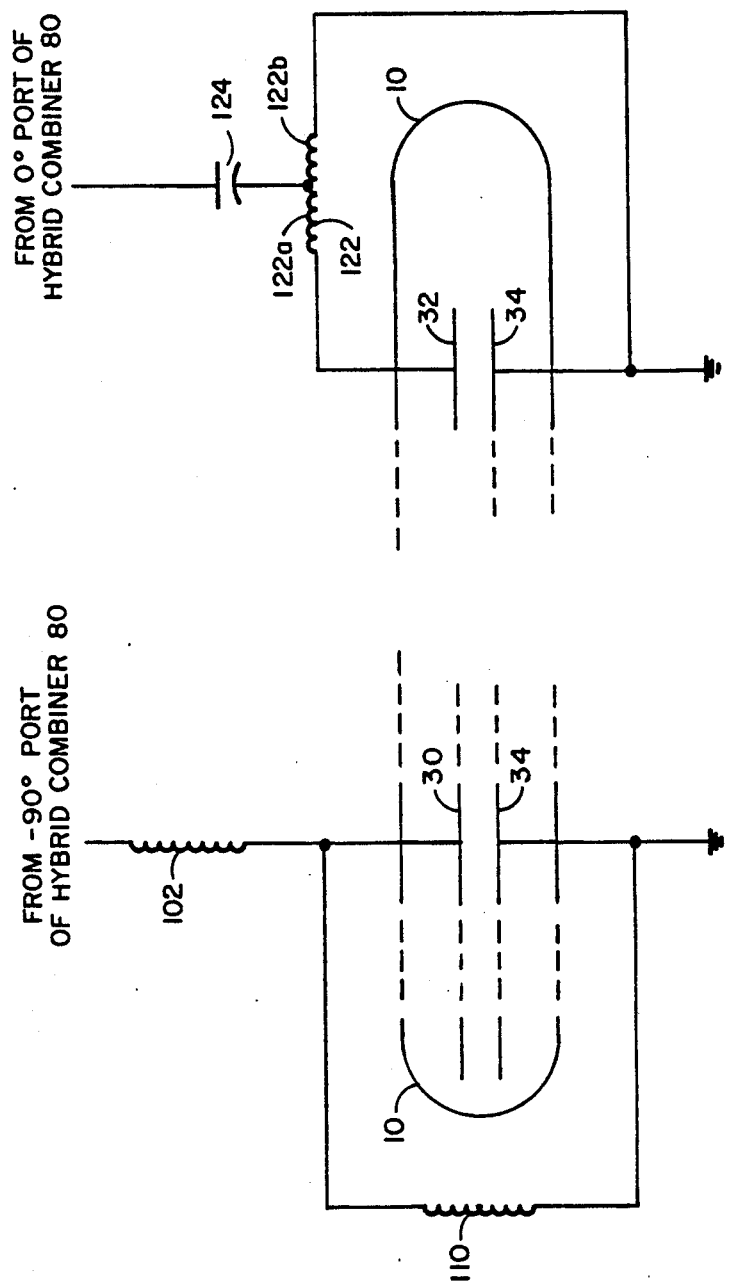

STARTER CIRCUIT FOR AN RF LASER

BACKGROUND OF THE INVENTION

The present invention relates generally to gas lasers and, more particularly, to a circuit for facilitating the start-up of a radio frequency driven laser by ionizing a portion of the gain medium of the laser.

A carbon dioxide ($CO_2$) radio frequency (RF) driven laser is typically used as a source of coherent radiation in systems such as laser sensor systems. Such sensor systems are frequently found on vehicles where human-attended operation is not possible, such as a missile or a satellite. Failure to start the laser in such a sensor system would result in complete failure for the entire system and possibly the mission. Thus, a highly reliable means for starting an RF laser may be of vital importance in such applications.

When two electrodes having a gas at low pressure between them are subjected to an increasing electrical potential, an initial, very small current will flow as the charged particles present in the gain medium gas are attracted to the electrodes. As the potential increases, the current increases rapidly as the electrons which are attracted to the positive electrode gain sufficient energy to ionize the gain medium atoms and thereby generate more current carriers. Suddenly, the current increases very rapidly and the voltage between the electrode drops as, under proper conditions, the gas achieves a self-maintaining discharge called a glow.

A discharge current may be maintained in a rarefied gas without the introduction of the electrodes into the gas. A tube of gain medium gas may be placed between two electrodes having a rapidly-alternating potential difference. The gas within the tube acts as a capacitor dielectric, and the gain medium may become luminous as a result of a discharge across the tube, similar to that of the discharge across internal electrodes.

RF lasers typically require much more RF driver power to initially ionize their internal gas mixtures than is required to maintain a steady state gas discharge under normal operating conditions. In some prior art gas laser systems, small amounts of xenon are added to the gas mixture to lower the potential required to ionize the gas medium. The high starting power requirement can be made even more severe by environmental temperature extremes or long time periods of inactivity of the laser.

Laboratory experience has shown that a difficult-to-start laser can usually be started if its internal gas mixture is stimulated by an electric discharge from a Tesla coil before RF power is applied. However, the inclusion of a conventional Tesla coil adds size, weight, complexity and expense to a laser system, and it may require an additional energy source to activate the coil.

SUMMARY OF THE INVENTION

It is therefore a primary object of the present invention to provide a reliable means for starting a gas laser.

It is a further object of the present invention to provide an improved starter circuit for ionizing the gas medium in an RF laser prior to start-up.

It is a still further object of the present invention to provide a starter circuit for an RF laser which does not require an energy source beyond that supplied to maintain the steady state gas discharge.

These and other objects are obtained generally by providing apparatus according to the present invention, the apparatus for use in a radiant energy source having first and second electrodes, means coupled to the first and second electrodes for producing an RF discharge therebetween, and a gain medium for emitting radiation in response to the discharge between the electrodes. The apparatus comprises a third electrode coupled to the means for producing an RF discharge, and means coupled to the discharge producing means and responsive to a control signal applied thereto for successively applying potentials to the third electrode and to the first electrode.

In accordance with a preferred embodiment of the present invention, there is disclosed an RF waveguide laser comprising a sealed envelope including a waveguide cavity, and first, second and third electrodes adjacent the waveguide cavity. The laser also comprises means coupled to the first and second electrodes and to a source of RF energy for producing an electrical discharge within the waveguide cavity. The laser additionally comprises a gain medium within the envelope for emitting coherent radiation in response to the electrical discharge between the electrodes. The laser further comprises means coupled to the second and third electrodes and to the source of RF energy for ionizing the gain medium. Finally, the laser comprises means coupled to the discharge producing means and to the ionizing means and responsive to a control signal applied thereto for successively enabling RF energy to the third electrode and to the first electrode.

With this arrangement, improved reliability in the start-up of an RF laser has been achieved. The disclosed apparatus causes ionization in the gain medium by energizing the third electrode for a short time period at start-up prior to energizing the first electrode. In this way, an initial high voltage start-up pulse uses the same energy source as is used during steady state gas discharge during normal operation.

BRIEF DESCRIPTION OF THE DRAWINGS

Other features and advantages of the present invention will be more fully understood from the following detailed description of the preferred embodiment, the appended claims, and the accompanying drawings, in which:

FIG. 3 is a schematic diagram of a matching network coupled to the main electrode of the gas laser;

FIG. 4 is a schematic diagram of a matching network coupled to the start-up electrode of the gas laser; and FIG. 5 illustrates in cross-sectional view a preferred embodiment of the matching network of FIG. 4.

DESCRIPTION OF THE PREFERRED EMBODIMENT

Figure 1:
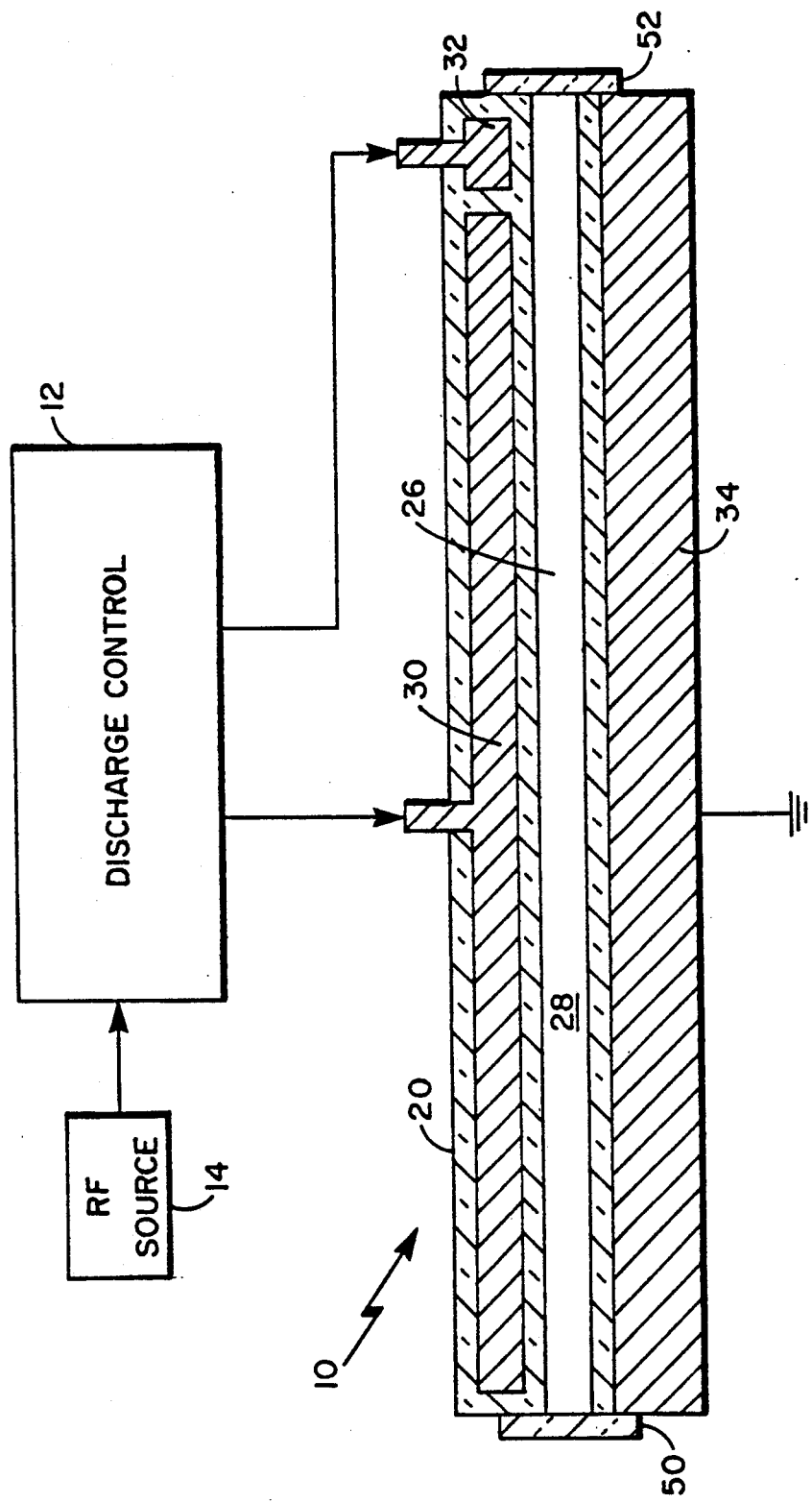
FIG. 1 illustrates a waveguide gas laser suitable for use with the present invention.

FIG. 1 illustrates, in partially schematic diagram form, an RF gas waveguide laser system including a gas laser 10 having a sealed envelope 20 and circuitry 12 for providing RF driver energy to produce a gas discharge within envelope 20. Envelope 20, which is illustratively fabricated of a ceramic material, contains within waveguide section 26 a gain medium 28, which may illustratively comprise carbon dioxide. Waveguide section 26 is illustratively 24 cm in length and 2 mm on a side in cross section, for a total gas volume within the waveguide of approximately one cubic centimeter.

Electrodes 30, 32 and 34 are adjacent envelope 20 at the boundaries of waveguide section 26. Electrodes 30 and 32 are longitudinally aligned on one side of waveguide 26; electrode 34 extends longitudinally on the opposite side of waveguide 26 and is typically coupled to ground potential. Electrode 30 is the main electrode; electrode 32 is the starter electrode. Main electrode 30 is substantially greater in length than starter electrode 32. In the present example, electrode 30 may typically be between 15 cm and 75 cm in length, illustratively 20 cm, and electrode 32 may typically be 6 mm long. The electrode pair comprising electrodes 30 and 32, and electrode 34 extend along substantially the entire length of waveguide section 26.

Discharge control 12 is provided to produce a discharge between electrodes 30 and 34. The discharge excites gain medium 28, thereby producing radiation emission. In accordance with the present invention, a radio frequency (RF) signal from RF source 14 is coupled into discharge control circuitry 12, which generates therefrom individual RF signals into gain medium 28 via electrodes 30 and 32. RF-excited laser 10 may be employed either in a continuous or pulsed mode of operation.

When laser 10 is used in the resonator mode, a totally reflecting mirror 50 is placed on the optic axis of laser 10 at one end of waveguide section 26 and a partially transmitting mirror 52 is placed on the optic axis at the opposite end of waveguide section 26. In other applications, mirrors 50 and 52 may be augmented by optical output windows, whose planes may be positioned at the Brewster angle with respect to the optic axis to control the polarization of the output laser pulses, as is well known in the art.

Figure 2:
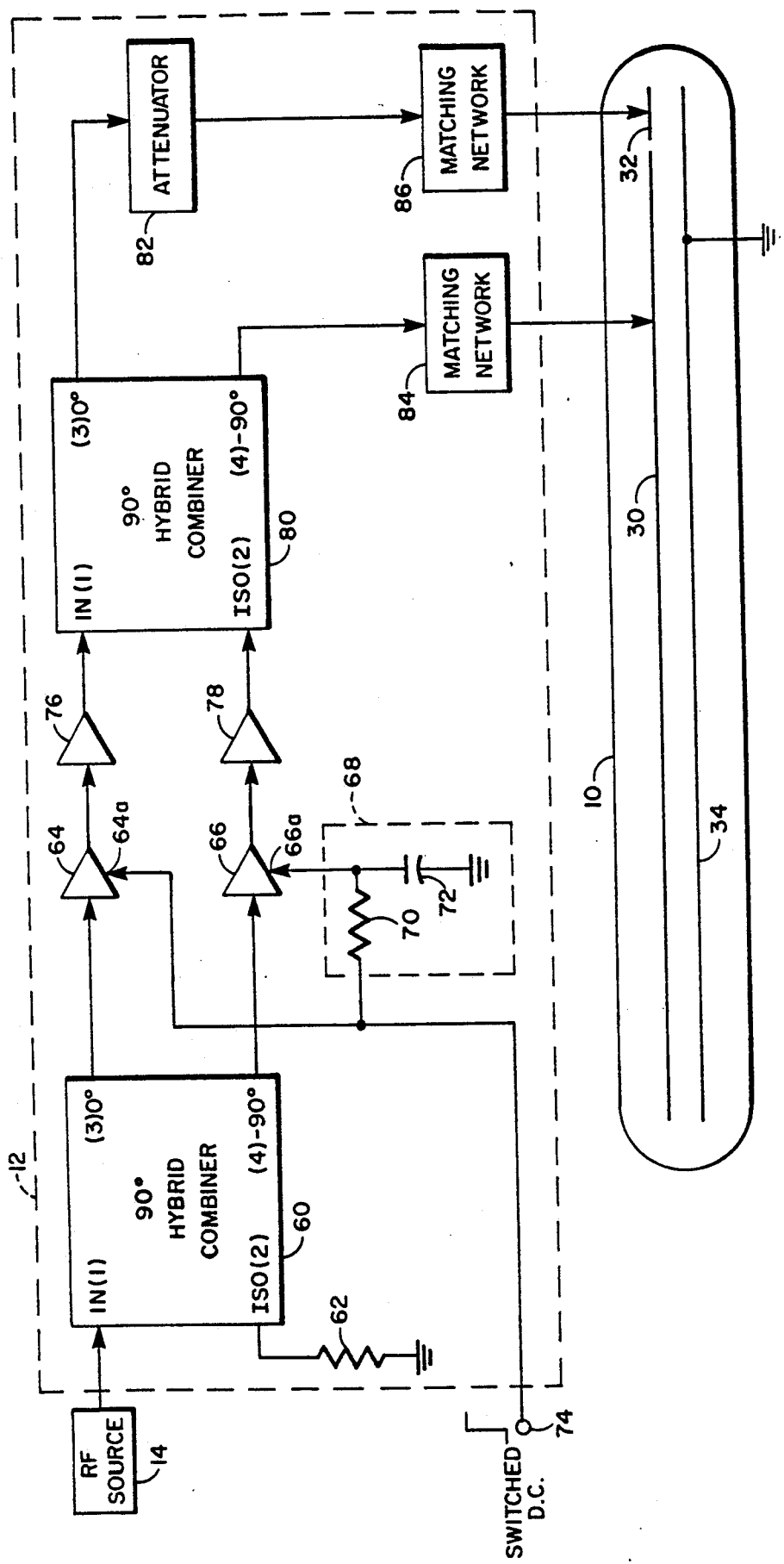
FIG. 2 is a schematic diagram of an RF laser system including a discharge control circuit embodying the principles of the present invention.

Referring to FIG. 2, there is shown a schematic diagram of an RF laser system according to the principles of the present invention. The laser system comprises a discharge control circuit 12 coupling an RF signal from RF souce 14 to main electrode 30 and starter electrode 32 of laser 10. Discharge control circuit 12 comprises hybrid couplers 60 and 80, amplifiers 64, 66, 76 and 78, low pass filter 68, attenuator 82 and matching networks 84 and 86.

In the present example, hybrid couplers 60 and 80 are both illustratively 3 dB quadrature (90°) hybrid couplers which may be similar to Model No. 170262-3, sold by Anaren Microwave, Inc., East Syracuse, N.Y. Hybrid couplers are well known by those skilled in the art and discussion of their operation is unnecessary. They may be configured to perform a great many functions, two of which are included in the present invention and will be discussed herein.

An RF signal, illustratively in the frequency range of 100 to 250 MHz, generated from RF source 14, is coupled to hybrid combiner 60 at its input port referred to as port 1 in the illustrative Anaren device and styled as "IN" in FIG. 2. With port 2, the port shown as "ISO", properly terminated by resistance 62, typically 50 ohms in the present example, the power applied at the input port will be divided equally between the two opposite ports, ports 3 and 4, shown as "0°" and "−90°", but with the phase of voltage at the −90° port lagging the phase of the voltage at the 0° port by 90°. The equal-amplitude, phase-shifted output signals from the 0° port and the −90° port from hybrid combiner 60 are applied, respectively, to the input ports of linear amplifiers 64 and 66.

Amplifiers 64 and 66 are substantially identical in gain and phase shift, and may be of a type similar to Model No. BM0240D020, sold by EPSCO, Inc., Westlake Village, Calif. Amplifiers 64 and 66 include gain control input ports 64a and 66a, respectively, for the application thereto of a control signal, the instantaneous dc level thereof regulating the gain of the amplifier, and therefore its output level. Typically, input ports 64a and 66a are used for automatic gain control (AGC) applications. In the present example, the illustrative amplifiers are linearly controlled at their outputs by the application of between 0 and 15 volts at their control input ports, wherein full output power occurs for 15 volts. volts at the control input port and no output signal is generated when the bias at the control input port is 0 volts.

Input terminal 74 is electrically coupled directly to gain control input port 64a of amplifier 64 and coupled through low-pass filter 68 to gain control input port 66b of amplifier 66. Low pass filter comprises series resistance 70 and shunt capacitance 72, and delays the effect of a voltage transition occurring at input terminal 74. In the present example, resistance 70 and capacitance 72 are selected to provide a delay in the range of one to five milliseconds in the application of full dc bias to control input port 66a of amplifier 66 from the time of a 0 to 15 volt transition at input terminal 74. That is to say, full power output from amplifier 66 occurs between 1 and 5 milliseconds after full power output is generated from amplifier 64.

The output signals from amplifiers 64 and 66 are coupled, respectively, to the input ports of amplifiers 76 and 78. Amplifiers 76 and 78 provide the power boost necessary to fire and maintain the RF discharge in laser 10. Amplifiers 76 and 78 are virtually identical in gain and phase shift, and may, for example, each be of a type similar to RF power amplifier Model No. MM450, sold by Kalmus Engineering International, Kirkland, Wash. These illustrative amplifiers provide output power of 150 watts at a frequency of 175 MHz.

The output signals from amplifiers 76 and 78 are coupled, respectively, to the IN and ISO ports of hybrid coupler 80 which is illustratively an identical device to hybrid coupler 60 described earlier. In this configuration of hybrid coupler 80, under the normal condition in which equal power levels are being applied to the IN and ISO ports from amplifiers 26 and 78, all of the input power from both amplifiers 76 and 78 is steered to the −90° port and no power appears at the 0° port. For an unbalanced condition, in which unequal amounts of power are delivered from amplifiers 76 and 78 to the IN and ISO ports of hybrid coupler 80, a certain amount of power will appear at the 0° port.

The signal at the −90° port of hybrid coupler 80 is coupled to a matching network 84, which provides impedance matching between the RF source and main electrode 30 of laser 10. Matching network 84 is selected to provide a near perfect impedance match to main electrode 30 during normal operation, that is, during discharge of gain medium 28 resulting from RF excitation. A preferred embodiment of matching network 84 is described in relation to FIG. 3.

The signal at the 0° port of hybrid coupler 80 is coupled through attenuator 82 to matching network 86, which matches the RF source to a high impedance level. The combination of starter electrode 32 and matching network 86 effectively functions as a Tesla coil, producing a very high RF voltage between electrodes 32 and 34, which may be, for example, on the order of 200 volts. Attenuator 82, which, in the present example, attenuates the RF signal to be applied to matching network 86 by approximately 10 to 20 dB, prevents damage to electrode 32 by reducing the energy of the high voltage excitation. A preferred embodiment of matching network 86 is described in relation to FIGS. 4 and 5.

The operation of the RF laser system of FIG. 2 may be described as follows: RF energy is continuously applied to discharge control circuitry 12 from RF source 14, and the RF gas discharge within laser 10 is typically switched by application of a dc voltage at input terminal 74. For a proper termination resistance 62 at port 2 of hybrid coupler 60, the RF signal at port 1 is equally divided and 90°-phase-shifted between the 0° and −90° ports. The equal amplitude signals from hybrid coupler 60, applied to amplifiers 64 and 66 are blocked when the gain control input signals at ports 64a and 66b are at zero volts.

When a voltage transition occurs at input terminal 74, for example, from 0 to 15 volts, a bias voltage appears immediately at gain control input terminal 64a of amplifier 64, and the RF signal at the 0° port of hybrid coupler 60 is amplified by amplifier 64, is further amplified by amplifier 76 and is applied to the IN port of hybrid coupler 80. Because, at this instant, there is virtually no RF signal at the ISO port of coupler 80, the inbalance causes an RF signal to appear at the 0° port of coupler 80, which signal is applied to matching network 86, resulting in a very high voltage, illustratively 200 volts, across electrodes 32 and 34 of laser 10. The gain medium 28 within waveguide 26 (see FIG. 1) in the region of starter electrode 32 will quickly ionize and the ultraviolet light from the discharge in the region of starter electrode 32 will cause ionization in the portion of waveguide 26 adjacent main electrode 30. In addition, diffusion of plasma into the region of main electrode 30 is also possible. In either case, the ionization of gain medium 28 by the application of a very high voltage on starter electrode 32 will lower the plasma striking potential on the portion of waveguide 26 adjacent main electrode 30.

The voltage transition occurring at input terminal 74, which appears immediately at the gain control input port 64a of amplifier 64, appears at the gain control input port 66a of amplifier 66 after being delayed by low pass filter 68. Thus, the RF signal at the −90° port of hybrid coupler 60 is amplified by amplifiers 66 and 78 and applied to the ISO port of hybrid coupler 80, but delayed in occurrence with respect to the RF signal appearing at the IN port of hybrid coupler 80.

As the delayed RF signal on the ISO port becomes equal in amplitude to the RF signal on the IN port, the RF signal level at the 0° port drops, shutting down the voltage on starter electrode 32. At the same time, the RF signal level at the −90° port increases, raising the level at main electrode 30 to a point where an RF discharge is triggered in the gain medium. Because of the ionization of the gain medium 28 due to the energizing of starter electrode 32 prior to the energizing of main electrode 30, the plasma striking potential has been lowered and a successful discharge is much more likely to occur. Once the output level from amplifiers 64 and 66 has equalized, the outputs of both amplifiers 76 and 78 are steered to the −90° port of hybrid coupler 80 and no energy is applied to starter electrode 32. During steady-state operation, the voltage between electrodes 30 and 34 is typically on the order of 100 volts.

Referring to FIG. 3, there is shown a portion of the laser system of FIG. 2, particularly illustrating in schematic form the elements of matching network 84. As was stated earlier, matching network 84 is selected to provide a near perfect impedance match to main electrode 30 during normal operation. Accordingly, the schematic diagram of FIG. 3 depicts inductance 110 forming a parallel resonant tank circuit with the parallel plate capacitance formed by electrodes 30 and 34. The value of inductance 110 is preferably selected to provide resonance of the tank circuit at the frequency of operation. Series inductance 102, coupled between the −90° port of hybrid combiner 80 and the tank circuit comprising inductance 110 and the capacitance of electrodes 30 and 34, is selected to provide an overall characteristic impedance of the total matching network of 50 ohms.

Referring to FIG. 4, there is shown a portion of the laser system of FIG. 2, particularly illustrating in schematic form the elements of matching network 86. As was stated earlier, matching network 86 is selected to match the RF source to a high impedance level, thereby greatly increasing the RF voltage applied to starter electrode 32. Accordingly, the schematic diagram of FIG. 4 depicts inductance 122 comprising a relatively large inductance section 122a coupled to a relatively small inductance section 122b. Inductance 122 forms a parallel resonant tank circuit with the parallel plate capacitance formed by electrodes 32 and 34. Capacitance 124 provides ac coupling between the 0° port of hybrid combiner 80 and the tap on inductance 122 joining inductance portions 122a and 122b. In this configuration, inductance 122 acts as a step-up transformer, transforming the RF signal from hybrid combiner 80 to a considerably higher voltage RF signal across electrodes 32 and 34, sufficient to ionize the gas medium within laser 10.

FIG. 5 illustrates a preferred embodiment of matching network 86 (of FIG. 2) as shown schematically in FIG. 4. Housing 134 is illustratively a section of copper tubing having an inside diameter of 0.5 inch (13 mm). One end of housing 134 is closed by an RF connector 132, preferably of the type known as a BNC connector. The other end of housing 134 is electrically coupled to ground (not shown). Within housing 134, coil 138, a portion of which comprises a helically formed conductor, preferably of copper wire, is electrically connected at one end to an inside surface of housing 134. The helix of coil 138 extends in a direction away from connector 132 with its longitudinal axis essentially parallel with the longitudinal axis of housing 134. Coil 138 is retained in a generally central position within housing 134 by support member 140. Support member 140 is preferably a nonconductive disk, fabricated, by way of example, of a plastic such as the polymer sold under the trademark Teflon, immovably positioned within housing 134. Coil 138 passes through a generally central aperture 140a in support member 140 and is coupled to starter electrode 32.

In the present example, RF connector 132 is a fixed-mounted jack, adapted to be mated with a corresponding plug (not shown). It will be understood that the signal from the 0° port of hybrid combiner 80 may be applied to a conductor in the aforementioned plug such that this signal is coupled to the center conductor 142 of RF connector 132 when the plug and jack are mated.

Within housing 134, conductor 136 is electrically attached to center conductor 142; conductor 136 is preferably a metallic disk, fabricated of copper. Conductor 136 is positioned in close proximity with coil 138 and is generally parallel to a portion 138a of coil 138 adjacent its connection to the inside surface of housing 134.

The relationship between the structure of FIG. 5 and the schematic diagram of FIG. 4 may now be seen. Coil 138 is the equivalent of inductance 122. Conductor 136 and portion 138a of coil 138, which comprise parallel conductors in close proximity, may be seen to be the equivalent of capacitor 124. Furthermore, it will be noted that the section of coil 138 between its capacitive coupling with conductor 136 and its connection with the inside surface of housing 134 is quite small in relation to the total helical length of coil 138. Thus, it will be seen that coil 138 includes a short section coupled to ground and a substantially longer section coupled to electrode 32, equivalent, respectively to the short section 122b of inductance 122 coupled to ground and substantially larger inductance section 122a coupled to electrode 32.

Although the starter circuit disclosed herein has been described for an application within an RF laser, it will be recognized by those skilled in the art that it may be applied in other situations without departing from the spirit of the invention. One such other situation might include any system requiring a plasma created by an RF discharge, as, for example, an RF sputtering system or an etching apparatus of the type used in the semiconductor industry. A further application might also include starter circuitry for RF excited lamps.

While the principles of the present invention have been demonstrated with particular regard to the illustrated structure of the figures, it will be recognized that various departures may be undertaken in the practice of the invention. The scope of this invention is not intended to be limited to the particular structure disclosed herein, but should instead be gauged by the breadth of the claims which follow.

What is claimed is:

1. In a radiant energy source including first and second electrodes, means coupled to said first and second electrodes for producing a radio frequency (RF) discharge therebetween, and a gain medium which emits radiation in response to the discharge between said electrodes, apparatus comprising:
    a third electrode coupled to said means for producing an RF discharge; and
    means coupled to said discharge producing means for successively applying, in response to a control signal, potentials to said third electrode and to said first electrode.

2. In a radiant energy source including first and second electrodes and further including a gain medium occupying interspace between said electrodes, apparatus comprising:
    a third electrode adjacent said second electrode, said gain medium further occupying interspace between said second and third electrodes;
    means coupled to said first, second and third electrodes for selectively applying RF energy from a source to said first and second electrodes and to said third and second electrodes; and
    means coupled to said applying means for enabling, in response to a control signal, successive application of said RF energy to said third and second electrodes and to said first and second electrodes.

3. The apparatus according to claim 2 wherein said means for enabling successive application of said RF energy includes;
    first and second amplifiers coupled between said source of RF energy and said applying means, each of said amplifiers including a control input terminal responsive to the level of voltage applied thereto for controlling the gain of said amplifier, said control signal being coupled to the control input terminals of said first and second amplifiers; and
    means coupled to the control input terminal of a first one of said first and second amplifiers for delaying the gain controlling of said first amplifier with respect to the second of said first and second amplifiers.

4. The apparatus according to claim 3 wherein said delaying means includes a low pass filter.

5. The apparatus according to claim 3 wherein said applying means includes a hybrid coupler having two input ports and two output ports, said first and second amplifiers being individually coupled at their output terminals to said two input ports of said hybrid coupler, said hybrid coupler being responsive to RF energy solely from said second amplifier for enabling said RF energy to a first of said two output ports, and responsive to RF energy in substantially equal amounts from said first and second amplifiers for enabling said RF energy solely to the second of said two output ports.

6. The apparatus according to claim 5 wherein said applying means further includes a matching network coupled between said second of said two output ports and said first electrode for providing an impedance match therebetween.

7. The apparatus according to claim 6 wherein said applying means further includes a network coupled between said first of said two output ports and said third electrode for providing an impedance mismatch therebetween.

8. The apparatus according to claim 7 wherein said network for providing an impedance mismatch includes a step-up transformer for substantially increasing the voltage of the RF energy coupled from said second amplifier.

9. The apparatus according to claim 3 wherein said gain medium comprises carbon dioxide.

10. The apparatus according to claim 2 wherein said first electrode is substantially larger than said second electrode.

11. In an RF waveguide laser including a sealed envelope having a waveguide cavity, first and second electrodes adjacent said waveguide cavity, means coupled to said first and second electrodes for producing a radio frequency (RF) discharge within said waveguide cavity, and a gain medium within said envelope which emits coherent radiation in response to said RF discharge between said electrodes, an apparatus for ionizing said gain medium, said apparatus comprising:
    a third electrode adjacent said waveguide cavity;
    means coupled to said second and third electrodes for ionizing said gain medium; and
    means coupled to said discharge producing means and to said ionizing means for successively actuating, in response to a control signal, said ionizing means and said discharge producing means.

12. An RF waveguide laser comprising:
    a sealed envelope including a waveguide cavity;
    first, second and third electrodes adjacent said waveguide cavity;

means coupled to said first and second electrodes and to a source of RF energy for producing an electrical discharge within said waveguide cavity;

a gain medium within said envelope which emits coherent radiation in response to said electrical discharge;

means coupled to said second and third electrodes and to said source of RF energy for ionizing said gain medium; and means coupled to said discharge producing means and to said ionizing means for successively enabling, in response to a control signal, RF energy to said third electrode and to said first electrode.

* * * * *